(12) United States Patent
Markle et al.

(10) Patent No.: US 6,721,689 B2
(45) Date of Patent: Apr. 13, 2004

(54) SYSTEM AND METHOD FOR HOSTED FACILITIES MANAGEMENT

(75) Inventors: Gary Markle, Hatfield, PA (US); James Miani, Plymouth Meeting, PA (US); Michael Hanson, Norristown, PA (US); Joseph Lewinski, Lansdale, PA (US); Robert Derwin, Blue Bell, PA (US); James Selph, Blue Bell, PA (US)

(73) Assignee: Icanon Associates, Inc., Blue Bell, PA (US)

( * ) Notice: Subject to any disclaimer, the term of this patent is extended or adjusted under 35 U.S.C. 154(b) by 138 days.

(21) Appl. No.: 09/994,968

(22) Filed: Nov. 28, 2001

(65) Prior Publication Data

US 2002/0116157 A1 Aug. 22, 2002

Related U.S. Application Data

(60) Provisional application No. 60/253,975, filed on Nov. 29, 2000.

(51) Int. Cl.$^7$ ................................................. G06F 3/05
(52) U.S. Cl. ..................... 702/188; 702/183; 702/187; 702/189
(58) Field of Search ................ 702/79, 80, 109, 702/176, 177, 180, 182, 183, 187, 188, 189, 198; 705/7.2; 380/277; 709/247

(56) References Cited

U.S. PATENT DOCUMENTS

| | | | |
|---|---|---|---|
| 4,212,078 A | 7/1980 | Games et al. .............. 364/900 |
| 4,644,478 A | 2/1987 | Stephens et al. ........... 364/550 |
| 5,892,690 A | 4/1999 | Boatman et al. ........ 364/528.11 |
| 5,955,946 A | 9/1999 | Beheshti et al. ........... 340/506 |
| 6,199,068 B1 * | 3/2001 | Carpenter ................... 707/100 |
| 6,237,786 B1 * | 5/2001 | Ginter et al. ............... 213/153 |
| 6,363,411 B1 * | 3/2002 | Dugan et al. ............... 709/202 |
| 6,415,270 B1 * | 7/2002 | Rackson et al. ............. 705/37 |

\* cited by examiner

Primary Examiner—Mark S. Hoff
Assistant Examiner—Felix Suarez
(74) Attorney, Agent, or Firm—Michael G. Crilly, Esq.

(57) ABSTRACT

A hosted facilities management system and method capable of simultaneously monitoring a plurality of conditions, equipment, and systems within one or more facilities is described and claimed. The monitoring system collects, archives, and processes data pertaining to utility services at a facility, environmental conditions within a facility, security around and within a facility, hazardous conditions within a facility, and equipment functionality including but not limited to manufacturing, telecommunications, and data management operations. Anomalous conditions are identified and reported. Data is filtered and compressed to facilitate the efficient storage and management of conditional state data collected from multiple sources. Archived data is retrieved and reported to client facilities via various means. Graphical, numerical, and plot reports are viewable over a distributed network.

9 Claims, 10 Drawing Sheets

SYSTEM AND METHOD FOR HOSTED FACILITIES MANAGEMENT

CROSS-REFERENCE TO RELATED APPLICATIONS

This application claims benefit under 35 U.S.C. 119(e) from U.S. Provisional Application No. 60/253,975 filed on Nov. 29, 2000.

FEDERALLY SPONSORED RESEARCH AND DEVELOPMENT

No Government License Rights.

BACKGROUND OF THE INVENTION

1. Field of the Invention

The present invention relates to a hosted facilities management system and method providing for the simultaneous monitoring of a plurality of conditions, systems, and components in a plurality of facilities based upon collecting, archiving, filtering, retrieving, and reporting conditional state data from the monitored facilities.

2. Description of the Related Art

The automation of business operations has greatly increased the technical complexities and the vulnerabilities of buildings and facilities. Automation is due in part to a competitive business environment demanding twenty-four hours per day, seven days per week fault-free operations. Many business operations depend on computers and communication systems requiring a controlled, reliable power supply, as well as a precisely maintained environment. Computerized manufacturing operations impose further challenges in terms of the constant monitoring of equipment and environment for operational failures and anomalous conditions. Such modern facilities and equipment are highly susceptible to fire and smoke damage thereby requiring real-time surveillance and rapid-response suppression systems. Reliance on expensive business equipment also increases the likelihood of intrusion and theft thereby requiring security surveillance.

Unfortunately, business automation coincides with the advent of the hostile building environment. Current building philosophies embrace a closed model thereby requiring electromechanical systems to provide an artificial environment within which personnel and equipment operate. For example, windowless or fixed window buildings not only require air conditioning to control the accumulation of heat but also a monitoring system to assess air quality and a circulation system to remove carbon dioxide, particulates, and hazardous gases generated by personnel and equipment. Each system requires a fault-free power supply and constant monitoring to identify mechanical failures.

Traditional facility management systems consist of a dedicated PC or server executing dedicated software. Monitoring is typically limited to one facility condition, for example the environment, one specific system residing within the facility, for example a computer network, or a specific system and one or two conditions specifically relevant to that system. Traditional management systems are generally located within the monitored facility and are based on a centralized monitoring unit attached to one or more sensors. Under the traditional model, the burden of data analysis and alert notification is borne by specialized and dedicated operations personnel located within the facility. It is readily obvious that such equipment, software, installation, and operation require continuous investment by the facility owner over the lifetime of the management system. It is also readily obvious that traditional approaches do not provide a comprehensive management capability for the real-time, total monitoring of multiple facilities.

Four examples of the traditional model are found in the related arts. Each is described below.

U.S. Pat. No. 4,212,078 issued on Jul. 8, 1980 to John E. Games et al. describes a facility management system (FMS) with a centralized processing unit interconnected to a plurality of remote controllers. The FMS monitors and controls the environmental conditions within several buildings from a central control building all located at one facility. Like many traditional management systems, Games monitors and controls a single condition, namely environment, within a single facility wherein the management equipment resides.

U.S. Pat. No. 4,644,478 issued on Feb. 17, 1987 to Lawrence K. Stevens et al. describes a general-purpose, centralized monitoring and alarm system enabling a user to define alarm variables and limits via a text-based system. Like other traditional management systems, Stevens facilitates the monitoring of a single system, for example environmental control equipment, within a single facility wherein the management system resides.

U.S. Pat. No. 5,955,946 issued on Sep. 21, 1999 to Ali Beheshti et. al. describes an alarm/facility management unit specifically relating to an end-to-end network manager for the real time monitoring of network elements and environmental conditions affecting such elements. Beheshti monitors the health of a communications facility by monitoring the condition of specific components within the network. Therefore like traditional management systems, Beheshti facilitates the monitoring of a single system, in this case a network, and achieves this by locating the monitor, a rack mounted unit, within the system.

U.S. Pat. No. 5,892,690, issued on Apr. 6, 1999 to Boatman et. al. describes an environmental monitoring system for collecting and recording environmental data pertaining to either air or water quality at various sites. Like traditional management systems, Boatman facilitates the monitoring of a single facility condition thereby lacking the means to collect, filter, archive, retrieve, and report conditional state data from a plurality of systems, sensors, and equipment within a plurality of facilities.

The related arts clearly demonstrate the limits of existing management systems. Presently, building and facility managers require a management tool that provides for the complete, efficient monitoring of complex interrelated facility systems, building systems, and equipment therein. Specifically, what is required is a single tool that conveniently enables personnel to evaluate top level conditions (i.e., utilities, environment, security, hazards, and equipment), to identify the location of any and all problems (i.e., area, sector, building, floor, or room), to identify any and all activated sensors and malfunctioning component (i.e., pumps, generators, communication equipments, air conditioning units, ventilation units, fire detection devices, smoke detection devices, intrusion detection devices, UPS (uninterrupted power supply), CRAC (computer room air conditioner), or PDU (power distribution unit)), and to determine which specific conditional level parameters are violated (i.e., current, voltage, load, and frequency).

The management tool should minimize on-site equipment, activities, and personnel at the client facility. The monitoring tool should collect, filter, and archive state data and provide a convenient graphical interface for the retrieval and reporting of all data. The management tool should be sufficiently robust to collect and archive the large volume of data associated with the monitoring of a plurality of diverse facilities. The management tool should provide instant notification to the client facility when a system, a component, or an operational level failure occurs or anomalous condition arises. The management tool should provide a historical archive to predict the onset of future failures and conditions. The management tool should be based on software residing at the host facility and accessible to the client. Finally, the management tool should provide user access through one or more communications means (i.e., telephone, fax, Internet, wireless telecommunications, and wireless data transmission). None of the above mentioned inventions is seen to describe the instant invention as claimed.

SUMMARY OF THE INVENTION

The present invention provides a centralized, hosted monitoring solution for the total management of a plurality of facilities. Such facilities might consist of one or more buildings or structures. The instant invention is sufficiently flexible to provide a customized monitoring solution for each and every monitored facility. The preferred monitoring solution requires no dedicated server or software at the client facility. Communications is provided through existing endpoint connections to the client's network, which are normally underutilized, and links to the Internet for data collection and reporting purposes. The use of existing networks and Internet links reduces or eliminates activities, such as wiring, thereby providing for quicker and simpler installation and removal of the management system.

The hosted nature of the instant invention provides several important advantages. First, no on-site personnel are required to monitor the facility. Second, the centralized location of monitoring hardware and software at a host facility reduces operational costs associated with upgrades and updates. Third, data analysis is performed by trained personnel at the host facility. Fourth, access to and retrieval of site specific data is achievable by authorized personnel through a personal computer with either wire-based or wireless Internet access or through a cellular phone with similar access.

It is an object of this invention to provide a management system that minimizes on-site equipment, activities, and personnel at the client facility. It is a further object of this invention to provide a monitoring tool to collect, filter, and archive state data and provide a convenient graphical/numerical interface for the retrieval and reporting of all data. It is an objective of this invention to be sufficiently robust to collect and archive the large volume of data associated with the monitoring of a plurality of diverse facilities. It is an object of this invention to provide a management tool for instant notification to the client facility when a system, a component, or an operational level failure occurs or anomalous condition arises. It is an object of this invention to provide a management tool that creates a historical archive thereby facilitating the prediction of future failures and conditions. It is an objective of this invention to be based on software residing at the host facility and accessible to the client. It is an objective of this invention to provide a system for the centralized, off-site location of analytical expertise to prevent, diagnose, and correct facility failures. Finally, it is an objective of this invention to provide a management tool allowing user access through one or more communications means, examples including but not limited to telephone, fax, Internet, wireless telecommunications, and wireless data transmission.

REFERENCE NUMERALS

Figure 3:
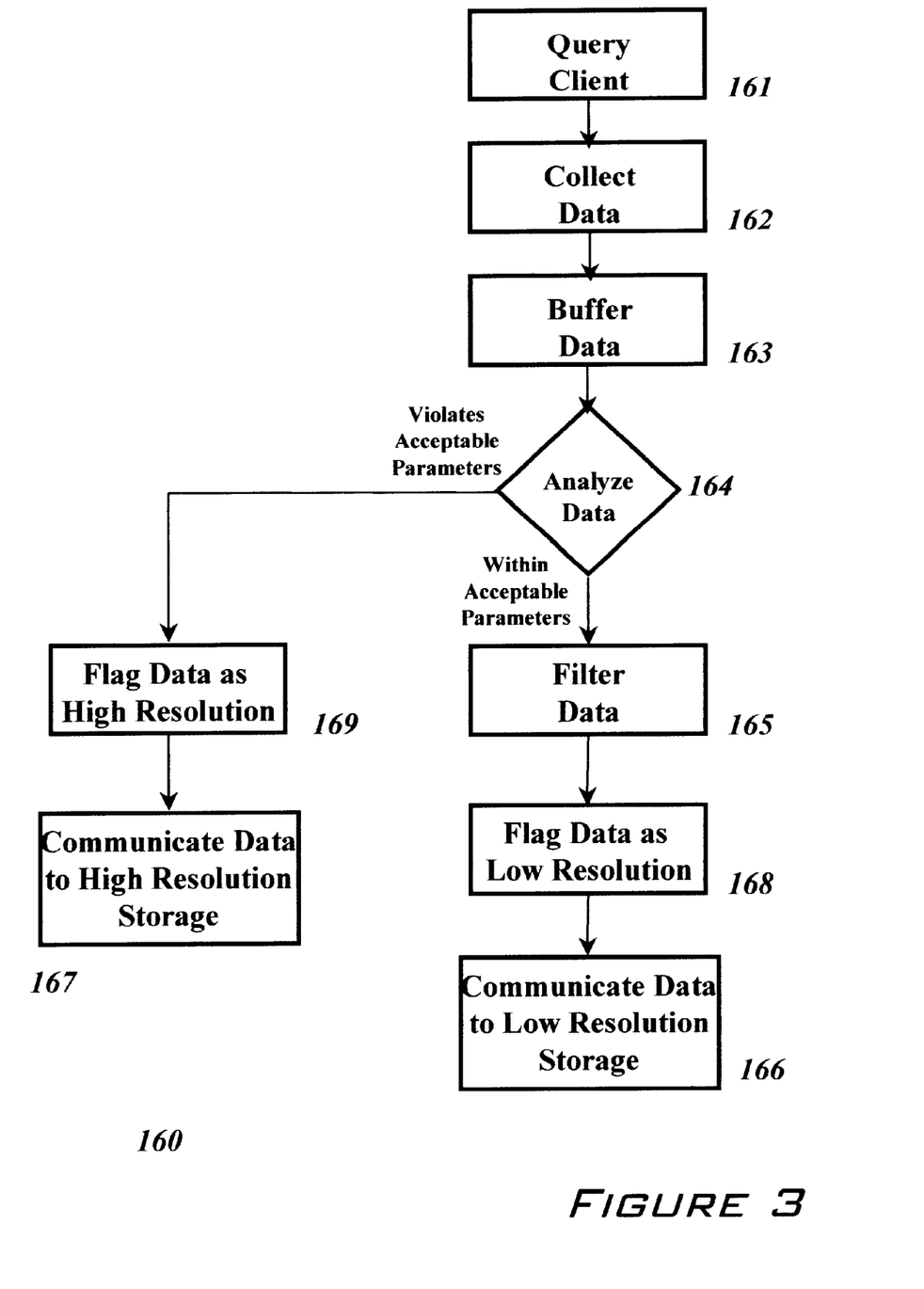
FIG. 3 is a flowchart for the data harvesting process.
Figure 4:
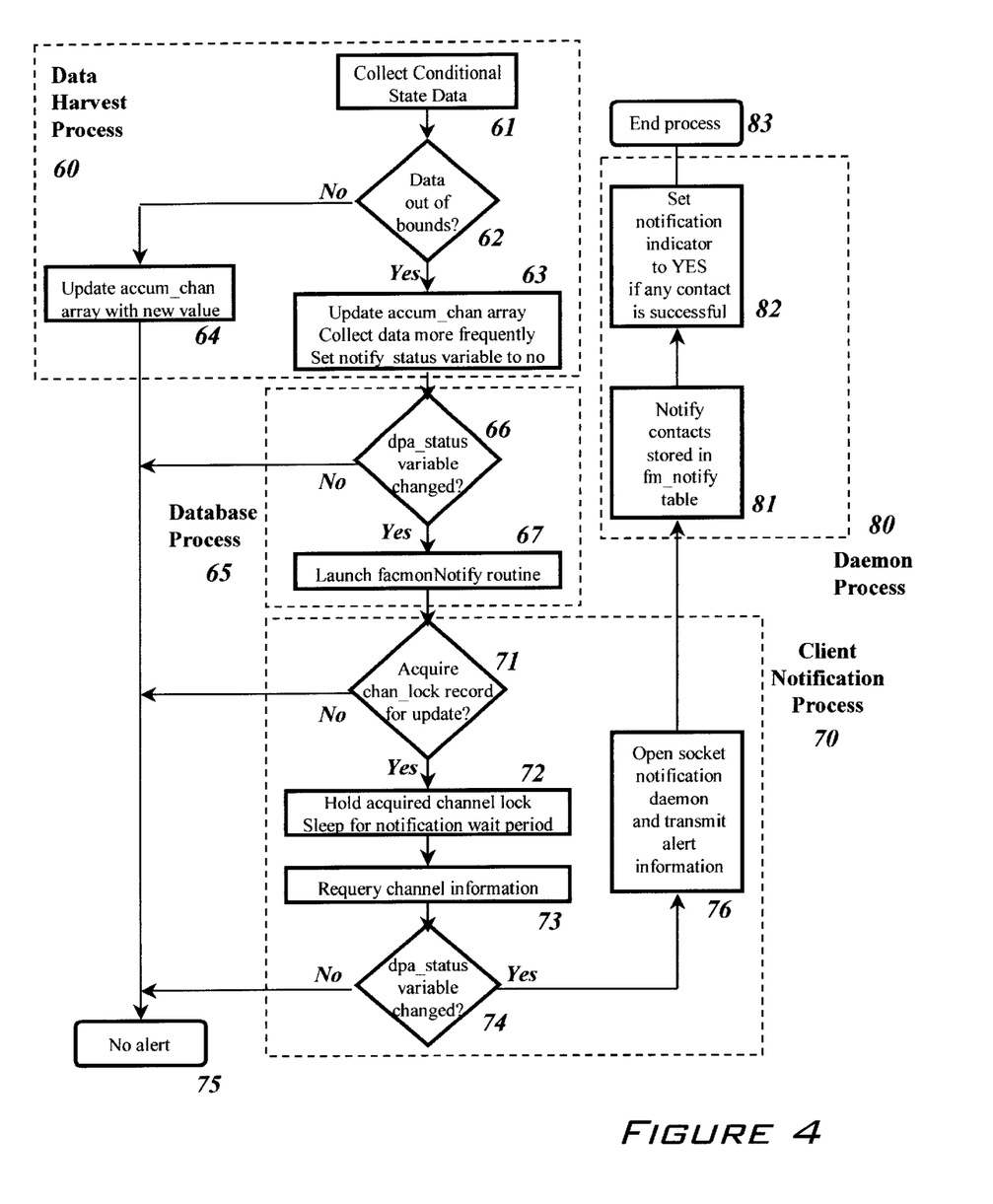
FIG. 4 is a flowchart for the notification algorithm.

1 Facility monitoring host
2 Internet
3 Client facility
4 Wire-based telecommunications
5 Wireless telecommunications
10 Host communications equipment
11 Data harvester
12 Data collection server
14 Event switch
16 High resolution data storage
18 Low resolution data storage
20 Reporting processor
22 Fax
24 Printer
30 Host network
32 Host workstation
40 Client communications equipment
41 Data accumulator
42 Converter
44 Equipment
46 Compliant equipment
48 Accumulator
50 Modem
52 Summary alarm
54 Client network
56 Alarm network
60 Data harvesting process
61–64 Flowchart steps FIG. 4
65 Database process
66–67 Flowchart steps in FIG. 4
70 Client notification process
71–75 Flowchart steps in FIG. 4
80 Daemon process
81–83 Flowchart steps in FIG. 4
90 Top level menu
91 Title bar
92 Navigator bar
94 Site bar
96 Data frame
98 Numerical data bar
100 Location menu
102 Utilities location frame
103 Environment location frame
104 Security location frame 105 Hazard location frame
106 Equipment location frame
110 Sensor menu
112 Utilities sensor frame
113 Environment sensor frame
114 Security sensor frame
115 Hazard sensor frame
116 Equipment sensor frame
120 Condition menu
122 Utilities condition frame
123 Environment condition frame
124 Security condition frame
125 Hazard condition frame
126 Equipment condition frame
150 Conditional state data
151 Help desk
152 Emergency report
154 Calendar report
157 Filtered data
158 Buffered data
160 Data harvesting software
161–167 Steps in FIG. 3
210 Web site
230 Menu title
231 Master alarm
232 Refresh time
233 Current date
234 Customer name
235 Current site
236 Indicator light
241 Date
242 Time
243 Alarm description
244 Equipment ID
245 Analog value
246 Acknowledgment box
301 Header
310 Plot
311 Abscissa
312 Ordinate
314 Upper operational limit
315 Lower operational limit
350 Database
351 Operational limits

DETAILED DESCRIPTION OF THE INVENTION

Figure 1:
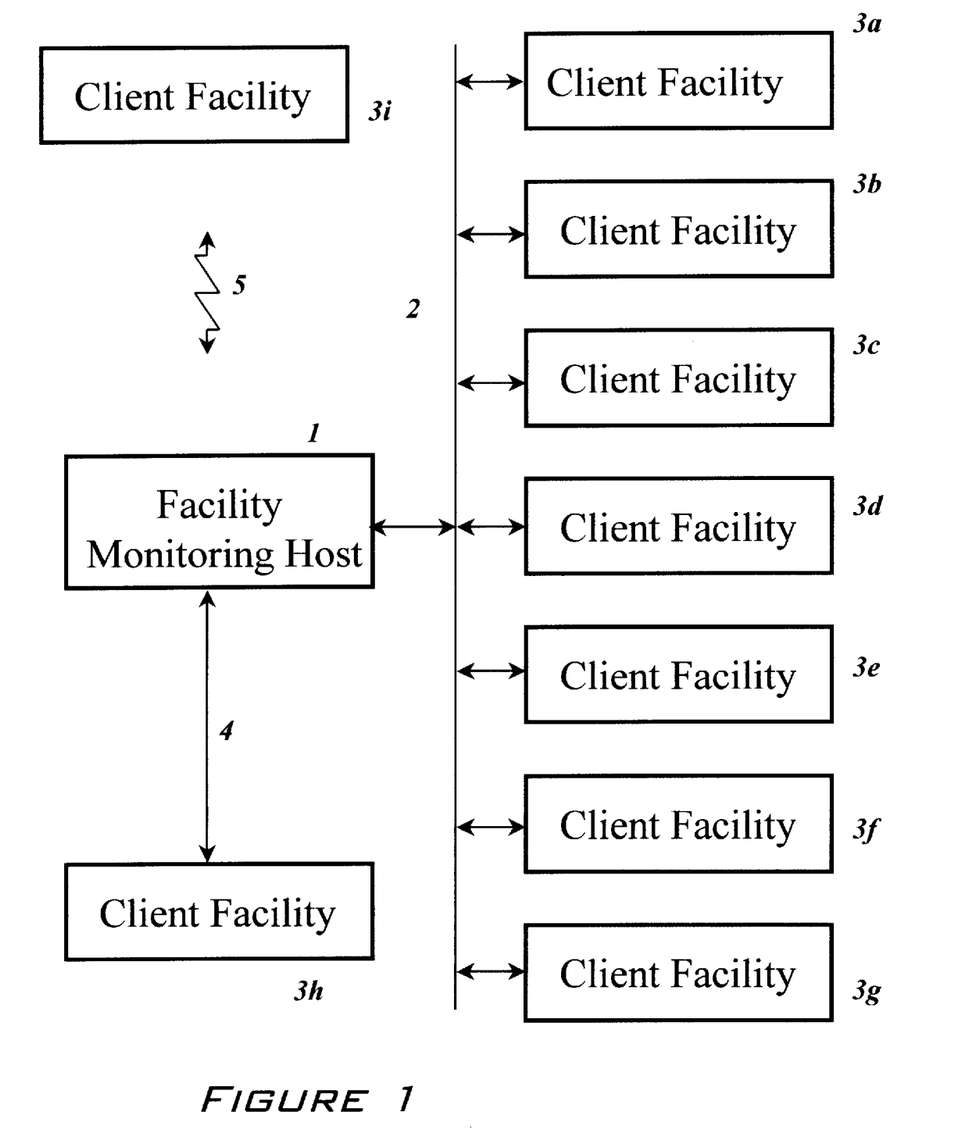
FIG. 1 is an illustrative view showing the facility monitoring host and various means of communication with client facilities.

The hosted facilities management system consists of a facility monitoring host 1 that communicates with a plurality of client facilities 3 via the Internet 2, wire-based telecommunications 4, and wireless telecommunications 5, as shown in FIG. 1. The primary function of the facility monitoring host 1 is to collect conditional state data 150 relating to utility services at client facilities 3, environmental conditions within client facilities 3, security conditions in and around client facilities 3, hazardous conditions within client facilities 3, and equipment performance at client facilities 3. The host monitoring facility 1 queries the client facility 3 via one or more of the communications means described above. Such queries may be initiated by personnel from the facility monitoring host 1, personnel from the client facility 3, or at predetermined time intervals by the facility monitoring host 1 or the client facility 3. Conditional state data 150 is communicated via one or more communications means described above from the client facility 3 to the facility monitoring host 1. The facility monitoring host 1 processes and archives conditional state data 150 thereby providing historical records for predicting the onset of future failures and conditions.

Conditional state data 150 are summarized and reported to the client in various forms. Emergency conditions and operational failures are immediately communicated to the client facility 3 via one or more communication means described above. An emergency report 152 is transmitted as a paper document via mail service or a facsimile transmission or an electronic mail message over the Internet 2. All conditional state data 150 are reported at predetermined time intervals designated calendar reports 154. Calendar reports 154 are transmitted as a paper document by mail or a facsimile transmission or an electronic document via the Internet 2 or dial-up modem 50. Both emergency reports 152 and calender reports 154 are accessible over the Internet 2 through a web site 210 maintained by the facility monitoring host 1. Personnel at the facility monitoring host 1 are accessible via telecommunications means from a help desk 151.

Figure 2:
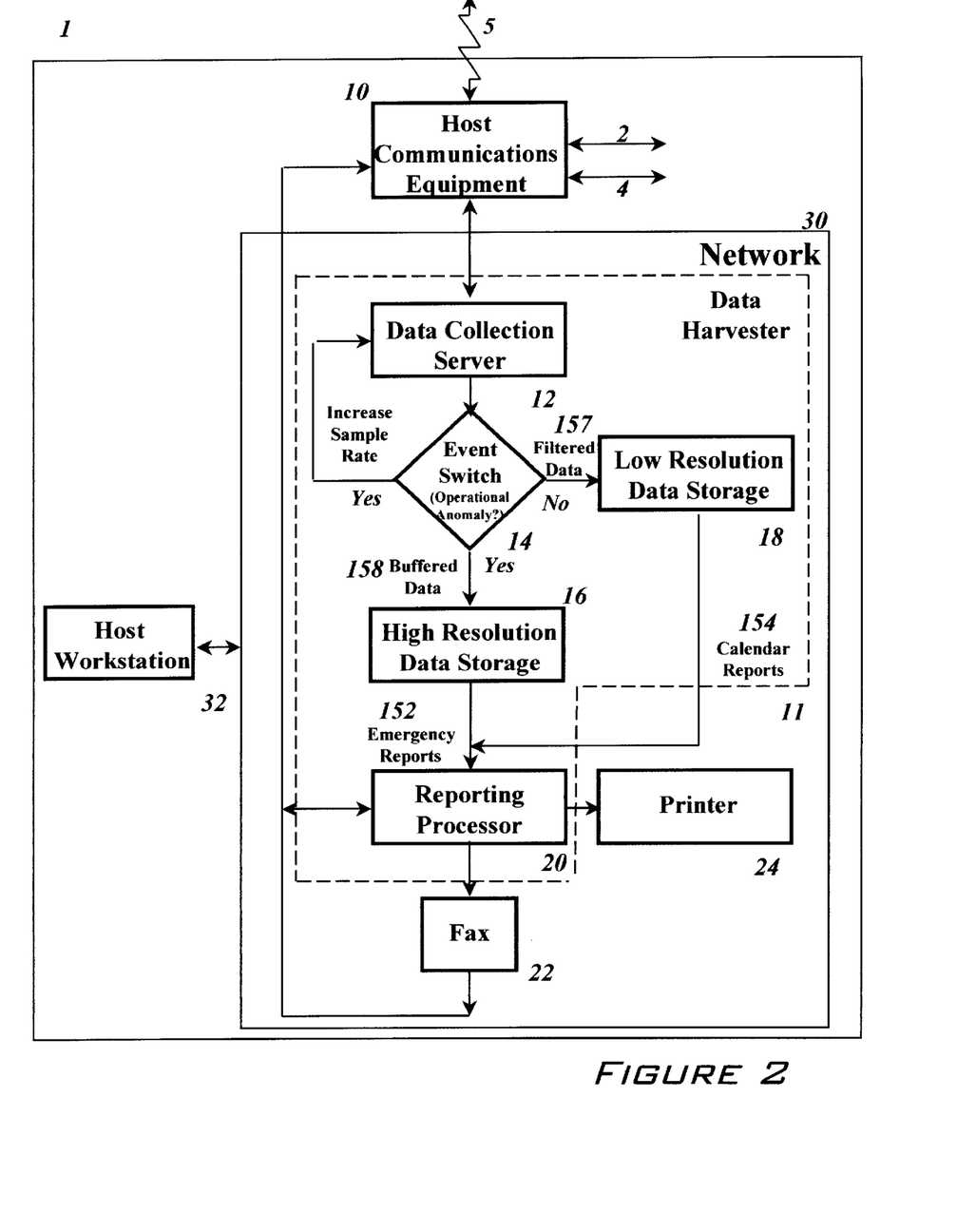
FIG. 2 is a schematic diagram for the facility monitoring host showing the collection, archiving, processing, retrieving, and reporting of conditional state data.

The facility monitoring host 1 is shown in the schematic diagram in FIG. 2. The facility monitoring host 1 consists of host communications equipment 10, data collection server 12, event switch 14, high resolution data storage 16, low resolution data storage 18, reporting processor 20, fax 22, printer 24, and host workstation 32. In the preferred embodiment, data collection server 12, event switch 14, high resolution data storage 16, low resolution data storage 18, and report processor 20 reside within a single self-contained unit. In other embodiments, one or more data collection servers 12, event switches 14, high resolution data storage 16, low resolution data storage 18, reporting processors 20, faxes 22, printers 24, and host workstations 32 may reside within a host network 30, for example an Ethernet. Networked components require either SNMP (simplified network management protocol) interfaces or RS-232/485/422 serial interfaces and connecting cables known within the art. The host workstation 32 allows personnel to monitor the performance of the facility monitoring host 1, as well as access client information and control operations.

The facility monitoring host 1 communicates with client facilities via host communications equipment 10 residing at the facility monitoring host 1. Communication means include Internet 2, wire-based telecommunications 4, and wireless telecommunications 5. For example, Internet 2 communications require one or more routers at both facility monitoring host 1 and client facility 3. Connection to the Internet 2 is achieved using TCP/IP protocol over one or more POTS (plain old telephone service) lines, frame relays, T1-lines, and T3-lines passing through a hub. An example hub being a Lantronix LRS manufactured by the Lantronix Corporation of Irvine, Calif. An intermediate Internet Service Provider (ISP) facilitates communications between facility monitoring host 1 and client facilities 3. Communication security is achieved by data encryption methods, VPN Secure Tunnel, and firewalls, all known within the art. Other telecommunications means require at least one modem 50 residing at both facility monitoring host 1 and client facilities 3.

Conditional state data 150 is collected, stored, processed, retrieved, and reported by the data harvester 11. The data harvester 11 consists of a data collection server 12, an event switch 14, high resolution data storage 16, low resolution data storage 18, and reporting processor 20. The data collection server 12 consists of one or more servers capable of running a plurality of processors and possessing data storage capabilities. Conditional state data 150 is collected, processed, and archived within a database 350 either as low resolution data storage 18 or as high resolution data storage 16. The database 350 is constructed with software known within the art, one example being INFORMIX developed by Informix of Menlo Park, Calif. Conditional state data 150 is tagged to identify the customer, the facility, the location, and the component or parameter. Table 1 describes data structures, variables and arrays comprising a typical database 350. Variable names are representative of content.

The data collection server 12 executes software to harvest data, referred to as data harvesting software 160. Software is written in C and Java programming code, both known to programmers within the art. FIG. 3 shows the flowchart for data harvesting software 160. Data harvesting software 160 queries client in step 161 for conditional state data 150 representing current conditions or conditions over a specified time period, collects data in step 162, and buffers data in step 163, thereafter designated buffered data 158, in a temporary storage array. For example, conditional state data 150 might be collected at one second intervals over one or several hours or one minute intervals over a day. Operation state data 150 is analyzed in step 164 to determine whether values fall within acceptable limits (i.e., lower and upper limits) defined by personnel at the client facility 3 or the facility monitoring host 1. When operation state data 150 falls within operation limits 351 for a specified time period it is filtered in step 165, thereafter designated filtered data 157, flagged in step 168 as such and communicated in step 166 to low resolution data storage 18 for long term archiving as represented by the event switch 14 in FIG. 2. Filtering consists of various user defined methods. For example, filtering might include identifying the low value, the high value, and calculating an average over a specified time period. When conditional state data 150 falls outside of the operational limits 351, it is buffered in step 163, thereafter identified as buffered data 158, for a time period before and after the anomaly, flagged in step 169 as such, and communicated in step 167 to high resolution data storage 16. High resolution data storage 16 and low resolution data storage 18 is provided by hardware known within the art including but not limited to hard drives, tape drives, and CD read/writable drives. In some applications, it may be necessary and desired to increase the sampling rate after an anomaly.

The reporting processor 20 is responsible for emergency reports 152 and calendar reports 154. Emergency reports 152 consist of buffered data 158 communicated immediately from high resolution data storage 16 to the reporting processor 20. Thereafter, the reporting processor 20 immediately notifies the client facility 3 of the emergency either by a paper document via printer 24 or facsimile document via fax 22 or by email via the Internet 2 through the host communications equipment 10 or by alphanumeric pager.

Calendar reports 154 consist of filtered data 157 stored in low resolution data storage 18. Filtered data 157 represents conditional state data 150 from a segment of time having been compressed into representative values either by averaging or other such numerical methods. Filtered data 157 resides in low resolution data storage 18 until such time as it is reported to the client either upon request or at specified time intervals. Under certain circumstances, emergency reports 152 and calendar reports 154 may be communicated to client facilities 3 verbally by personnel from the help desk 151 at the facility monitoring host 1.

FIG. 4 shows the flowchart describing the interaction of data harvesting process 60, database process 65, client notification process 70, and daemon process 80. Database process 65, client notification process 70, and daemon process 80 are written in C and Java programming languages. The data harvesting software 160 is an integral part of the data harvesting process 60. During the data harvesting process 60, the data collection server 12 collects conditional state data 150 from one or more client facilities 3 at a defined sampling rate in step 61 or upon demand by a user. Conditional state data 150 may or may not violate operational limits 351 as determined in step 62. When conditional state data 150 is within operational limits 351, the data harvesting process 60 updates variables in the database 350, in particular the accum_chan data structure defined in Table 1, in step 64 and no alert in step 75 is executed thereby bypassing database 65, client notification 70, and daemon 80 processes. When conditional state data 150 violates operational limits 351, the accum_chan structure is updated more frequently as noted in step 63 and the database process 65 is executed.

The database process 65 archives data to the database 350. The database process 65 analyzes the channel alarm status, stored in the dpa_status variable in accum_chan structure, in step 66 to determine whether a change has occurred. If the channel alarm in unchanged, the database process 65 is terminates with no alert in step 75. When the channel alarm changes, the database process 65 launches the notification routine in step 67 and the client notification process 70 is executed.

The client notification process 70 determines whether it can acquire the chan_lock structure for update as in step 71. If the client notification process 70 fails to acquire the $chan_{13}$ lock, the process terminates without alert in step 75. Otherwise, the client notification process 70 holds the channel lock in step 72 and queries the channel for more information in step 73. A second comparison is made in step 78 determining whether the dpa_status variable has changed and terminating the process 70 without alert in step 75 if no change is detected. Where the dpa_status variable has changed, the client notification process 70 opens a socket notification daemon and transmits an alert as in step 76 whereafter control passes to the daemon process 80.

The daemon process 80 is responsible for transmitting emergency reports 152 to all contact points or persons listed in the fm_notify structure as in step 81. When a contact point is successfully notified of the emergency, a notification indicator is set to yes in step 82 and the daemon process 80 terminates in step 83. Otherwise the daemon process 80 continues sending alert messages until such time as any one notification is acknowledged.

Figure 5:
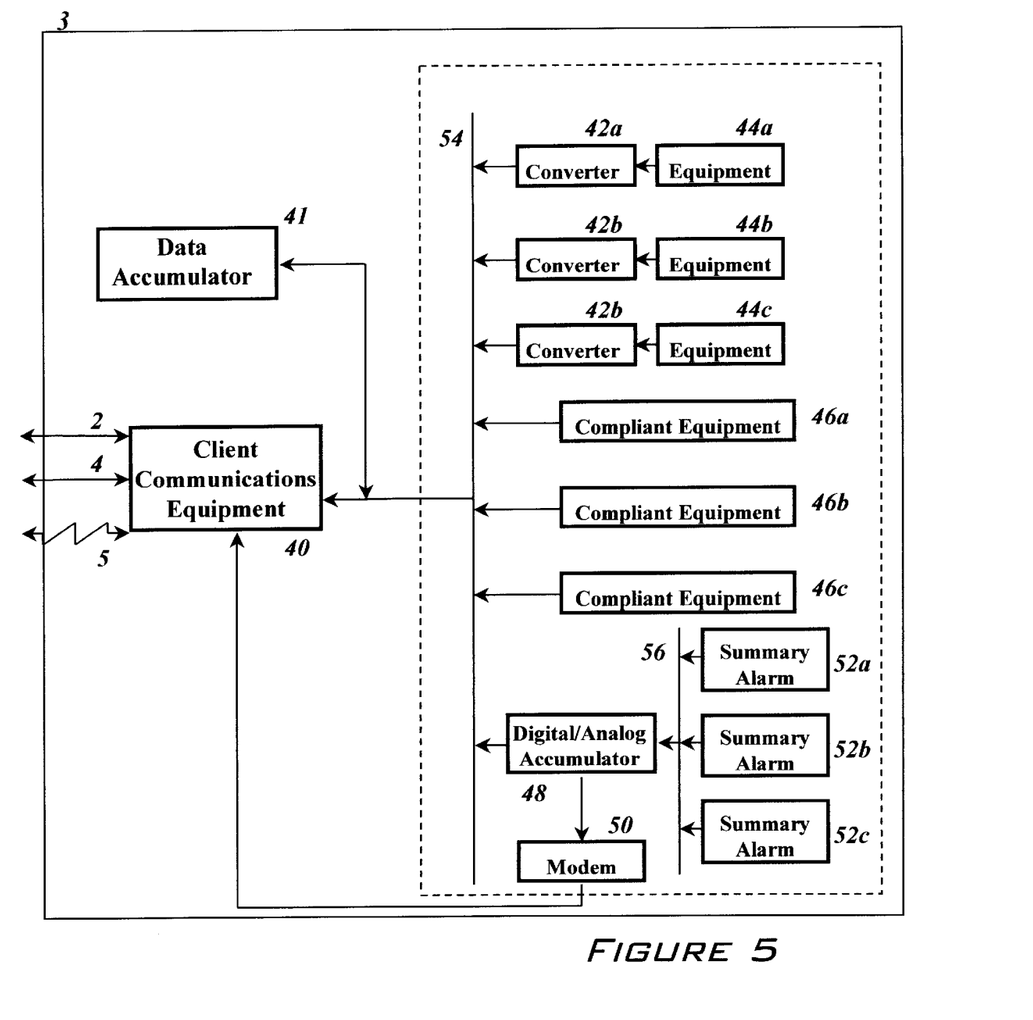
FIG. 5 is an illustrative view showing a client facility and the various means for collecting and communicating conditional state data from equipment and alarms within the client facility.

FIG. 5 shows a schematic diagram of a representative client facility 3. A single client facility 3 may include equipment 44, compliant equipment 46, and summary alarms 52, as well as a digital to analog accumulator 48, modem 50, client communications equipment 40, and data accumulator 41. Example equipment 44 and compliant equipment 46 include but are not limited to PDU's, CRAC's, and UPS's. Summary alarms 52 monitor such items as temperature, voltage, humidity, fire alarms, smoke alarms, intrusion alarms, air conditioning units, air circulation units, fluid flow and levels, liquid detection devices, equipment status, emergency systems, and door closures. Summary alarms 52 may reside within an alarm network 56, for example an Ethernet. Equipment 44, compliant equipment 46, summary alarms 52, and alarm networks 56 may reside within one or more other client networks 54. Networked components require either SNMP interfaces or RS-232/485/422 serial interfaces and connecting cables all known within the art.

Compliant equipment 46 are connected directly to the client network 54, whereas equipment 44 require a converter 42. An example converter 42 is a CoBox manufactured by Lantronix's of Irvine, Calif. Both equipment 44 and compliant equipment 46 communicate with the facility monitoring host 1 across a client network 54.

In some applications, summary alarms 52 may require an analog to digital accumulator 48 within the client network 54. The preferred accumulator 48 is the Falcon Monitor manufactured by RLE Technologies of Fort Collins, Colo. supporting IP (Internet Protocol) and SNMP. Accumulators 48 communicate with the facility monitoring host 1 across a client network 54 or by modem 50. The Falcon has a built-in modem facilitating telephonic communications. When the Falcon is used in conjunction with a Lantronix's CoBox, as described above, a dial-up TCP-IP connection is possible thereby facilitating data harvesting by and alert services from the facility monitoring host 1. In an other embodiment, the Falcon is connected to the alarm network 56 through its network port allowing access by the facility monitoring host 1 over the Internet 2.

Client network 54 and modem 50 communicate with the facility monitoring host 1 via client communications equipment 40 to provide Internet 2, wire-based telecommunications 4, and wireless telecommunications 5 access. Information pertaining to equipment 42, compliant equipment 46, and summary alarms 52 is provided to the facility monitoring host 1 directly or stored at the client facility 3 by a data accumulator 41 for retrieval at a later date. The data accumulator 41 is a multiplexing and interim data storage device for delivering data in packet format. An example data accumulator 41 is a generic personal computer with Linux operating system or its equivalent. In the preferred embodiment, the data harvester 11 at the facility monitoring host 1 contacts the data accumulator 41 and retrieves all buffered data 158. In another embodiment, data harvesting is performed at the client facility 3 by a data harvesting process 60 residing within the data accumulator 41. Low resolution data storage 18 is either performed at the client facility 3 or the facility monitoring host 1. High resolution data storage 16 is performed at the facility monitoring host 1 to facilitate client notification of anomalous conditions.

Personnel at the client facility 3 may access conditional state data 150 over the Internet 2 via a web site 210 hosted by the facility monitoring host 1. The web site 210 includes multiple menus displaying conditional state data 150 both graphically and numerically.

Figure 6:
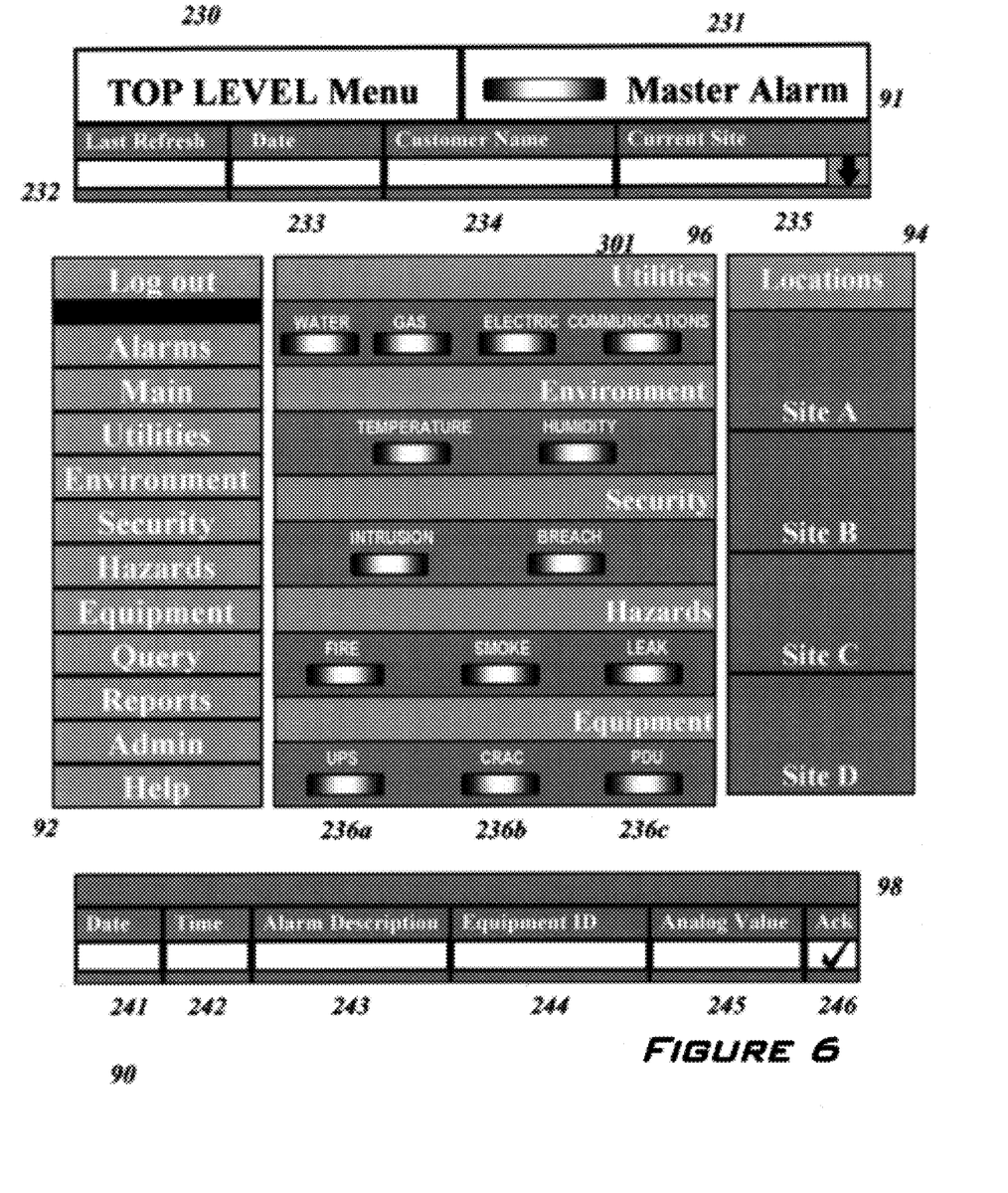
FIG. 6 shows a typical top level menu from the client interface.
Figure 7:
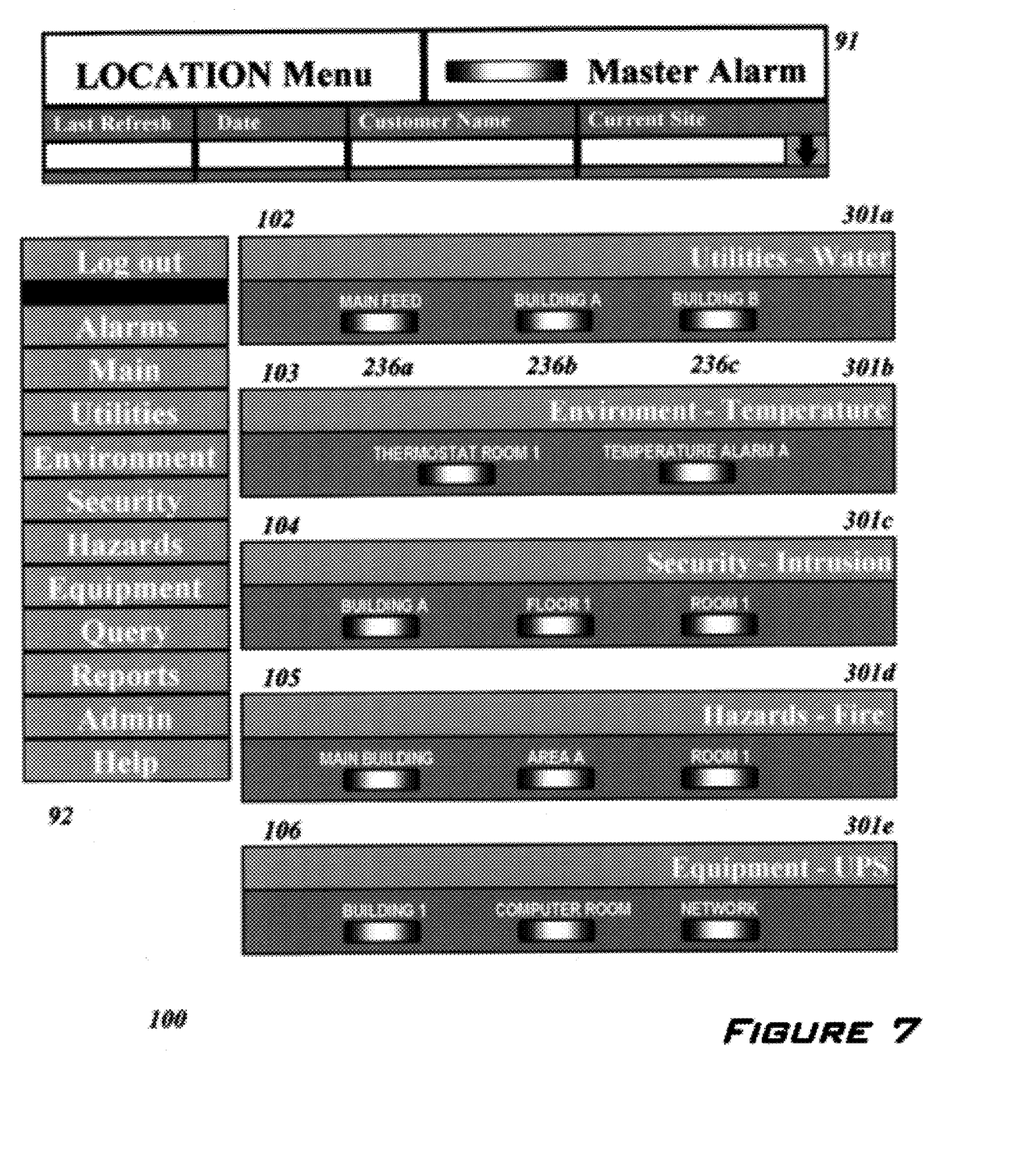
FIG. 7 shows a typical location menu from the client interface.
Figure 8:
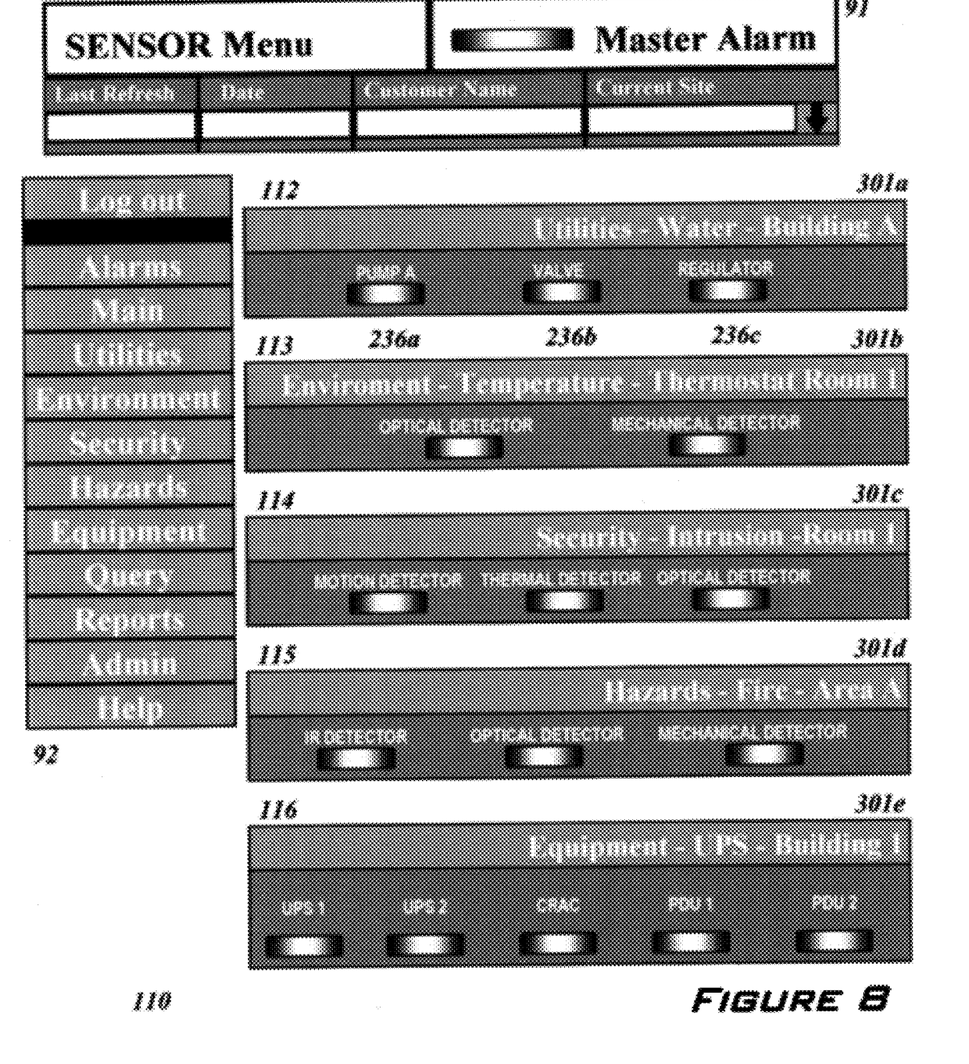
FIG. 8 shows a typical sensor menu from the client interface.
Figure 9:
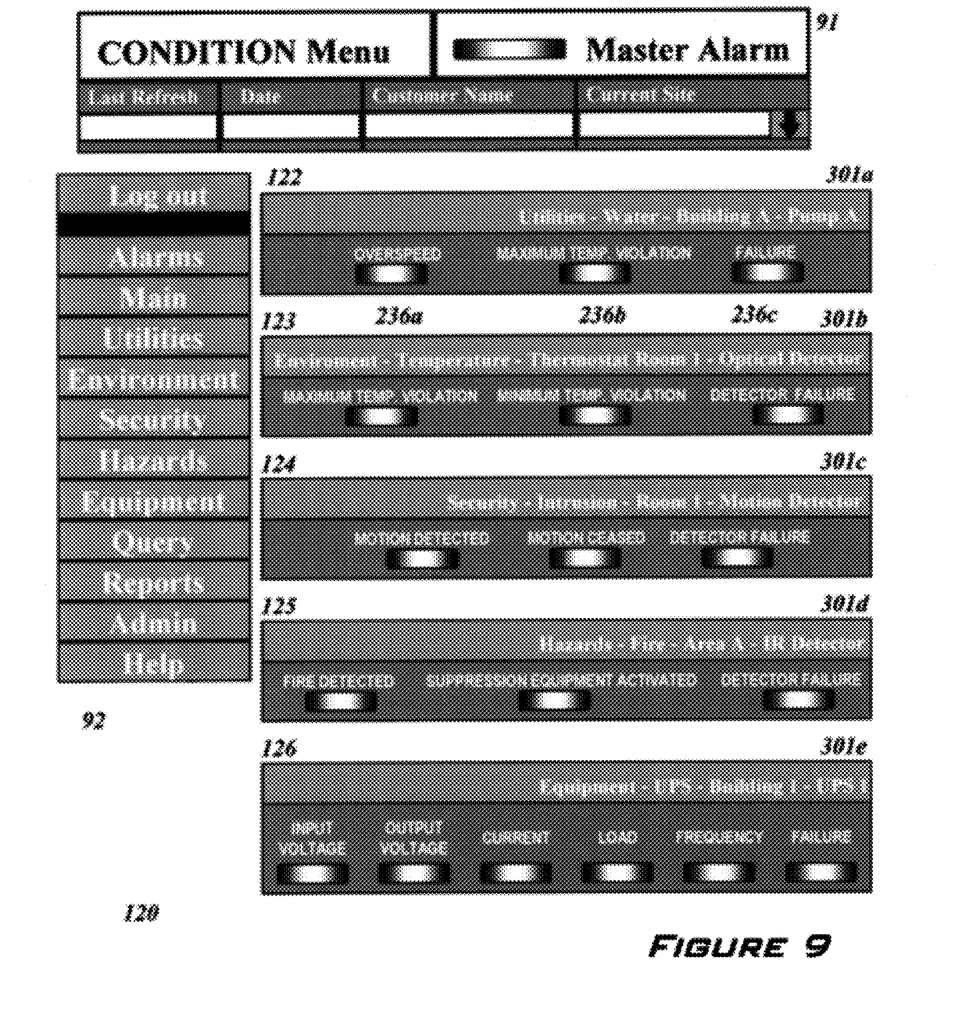
FIG. 9 shows a typical condition menu from the client interface.

Menu content is customized for specific client needs. FIGS. 6 through 9 describe one embodiment of the web site 210 although an infinite number of layouts are possible. The top level menu 90 identifies the conditional status of utilities, environmental conditions, security, hazards, and equipment 44, as shown in FIG. 6. The location menu 100 identifies the conditional status at specific locations within the client facility 3, as shown in FIG. 7. The sensor menu 110 identifies the conditional status of specific components within a location, as shown in FIG. 8. The condition menu 120 identifies the conditional status of specific operational state data for components, as shown in FIG. 9. The web site 210 is developed with software known within the art. Menus retrieve and display data residing within low resolution data storage 18 and high resolution data storage 16. Access to menu level data is restricted by security routines, known within the art, to personnel authorized by the client facility 3. For example, a facility manager may have access to all data levels whereas a maintenance employee may have access to the top level menu 90 only. Displayed information is updated at predetermined time intervals.

FIG. 6 shows a typical top level menu 90 consisting of a title bar 91, navigator bar 92, site bar 94, data frame 96, and numerical data bar 98. The title bar 91 and navigation bar 92 are displayed in all menus. The title bar 91 includes the menu title 230, the master alarm 231, the refresh time 232 (when data within the menu was last refreshed), the current date 233, the customer name 234, and the current site 235. The master alarm 231 is green when no faults, failures, or emergencies exist at the client facility 3. The current site 235 includes a pull-down box to select other client facilities 3 for review. The navigator bar 92 provides shortcuts to specific items in other menus. For example, positioning the screen cursor over the security button and clicking the mouse button displays the next level of data for that item.

The site bar 94 identifies client facilities 3 accessible to the client facility 3. The site bar 94 identifies client facilities 3 operating without anomalies in green, otherwise the client facility 3 is displayed in red.

The data frame 96 identifies various items monitored at the client facility 3. For example, security monitoring includes building intrusion and perimeter breaches. The indicator light 236 below each item summarizes the status of that item. For example, green represents no intrusion or breach and red indicates an intrusion or a breach. The data frame 96 contains one or more headers 301, identifying the top level items displayed (i.e., utilities).

The numerical data bar 98 summarizes information pertinent to the fault, failure, or anomalous condition. The date 241 and time 242 identify when the alarm condition occurred. The alarm description 243 briefly describes the condition. Equipment ID 244 identifies the item affected. The analog value 245 indicates the value of the offending parameter. The acknowledgment box 246 is checked by positioning the screen cursor over the box and clicking the mouse button thereby notifying the facility monitoring host 1 that the client facility 3 is aware of the anomaly.

Lower level menus, namely location 100, sensor 110, and condition 120, are accessed by positioning the screen cursor over any indicator light 236 within the data frame 96 and selecting the item via mouse button or keyboard. For example, where the user selects the indicator light 236 corresponding to either the PDU 236a, CRAC 236b, or UPS 236a, the location menu 100 is displayed to provide further information pertaining to PDU, CRAC, and UPS.

FIG. 7 shows a typical location menu 100. A representative utilities location frame 102, environment location frame 103, security location frame 104, hazard location frame 105, and equipment location frame 106 are shown and described. Several examples are provided. The utilities location frame 102 displays the status of water service into the client facility 3 (Main feed) and at specific locations (i.e., buildings). The environment location frame 103 displays the status of temperature conditions within one or more areas. The security location frame 104 displays the security integrity at one or more locations. The hazard location frame 105 displays the absence or presence of fire at one or more locations. The equipment location frame 106 displays equipment operating status at one or more locations or within specific systems. Normal operations are displayed by a green indicator light 236. Anomalous conditions are represented by a red indicator light 236. Each frame contains a header 301 identifying the top level parameter for which information is displayed. Lower level menus are accessed by positioning the screen cursor over any indicator light 236 and selecting the item via mouse button or keyboard.

FIG. 8 shows a typical sensor menu 110. A representative utilities sensor frame 112, environment sensor frame 113, security sensor frame 114, hazard sensor frame 115, and equipment sensor frame 116 are shown and described. Several examples are provided. The utilities sensor frame 112 indicates the operational status of pumps, values, and regulators from which sensor information is gathered at a specific location. The environment sensor frame 113 identifies the status of one or more temperature alarms. The security sensor frame 114 identifies the status of one or more intrusion sensors. The hazard sensor frame 115 identifies the status of one or more fire sensors. The equipment sensor frame 116 identifies the functional status of specific systems residing within the client facility 3. Normal operations are displayed by a green indicator light 236. Anomalous conditions are represented by a red indicator light 236. Each frame contains a header 301 identifying the parameter for which information is displayed. Lower level menus are accessed by positioning the screen cursor over any indicator light 236 and selecting the item via mouse button or keyboard.

FIG. 9 shows a typical condition menu 120. A representative utilities condition frame 122, environment condition frame 123, security condition frame 124, hazard condition frame 125, and equipment condition frame 126 are shown and described. Several examples are provided. The utilities condition frame 122 identifies the status of specific operating parameters recorded by a sensor on a specific component. The environment condition frame 123 identifies temperature conditions violating defined limits. The security condition frame 124 identifies whether motion was sensed and if it ceased. The hazard condition frame 125 indicating whether a fire was detected and the status of fire suppression equipment. The equipment condition frame 126 identifies operating parameters for specific components or systems. The failure of components, equipment, detector, and sensor are also provided. Normal operations are displayed by a green indicator light 236. Anomalous conditions are represented by a red indicator light 236. Each frame contains a header 301 identifying the specific item for which information is displayed.

Some parameters (i.e., voltage, current, frquency) described in the condition menu 120 may consist of time dependent data requiring graphical representation. For example, a client may wish to view the temperature in room 1 as recorded by the appropriate detector. Such plots 310 are accessed by positioning the screen cursor over the indicator light 236 for the parameter of interest and selecting the item via mouse button or keyboard.

Figure 10:
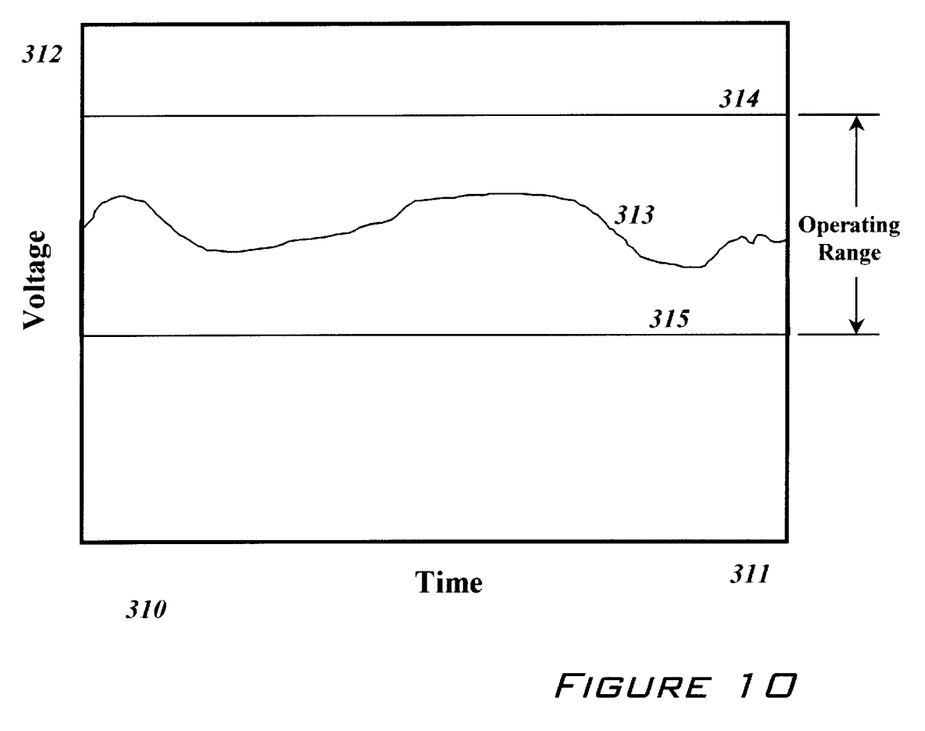
FIG. 10 shows a typical parameter plot for an item identified in the condition menu.

FIG. 10 shows a typical plot 310 of parameter data. For example, voltage history profiles are represented by plotting time along the abscissa 311 and voltage along the ordinate 312. Either buffered data 158 or filtered data 157, upper operational limit 314, and lower operational limit 315 might be represented for buffered data 158 residing in high resolution data storage 16 and for filtered data 157 residing in low resolution data storage 18.

The description above indicates that a great degree of design flexibility is offered in terms of the configuration and capabilities of the facility monitoring host 1 and client facilities 3. Although the present invention has been described in considerable detail with reference to certain preferred versions thereof, other versions are possible. Therefore, the spirit and scope of the appended claims should not be limited to the description of the preferred versions contained herein.

TABLE 1

| Data Structure | Variable | Format | Cross Reference |
|---|---|---|---|
| chan_lock | acc_unique | integer | procedures, chan_prop |
| value_set | tabname | char(20) | |
| | colname | char(20) | |
| | value | char(25) | |
| | meaning | char(80) | |
| derived_pgm | ep_unique | integer | equip_prop |
| | pgm_seq_num | integer | |
| | pgm_line | char(640) | |
| | pgm_descr | char(256) | |
| prnter | pr_qname | char(14) | |
| | pr_description | char(40) | |
| | pr_location | char(40) | |
| | bold_on | char(6) | |
| | bold_off | char(6) | |
| | under_on | char(6) | |
| | under_off | char(6) | |
| | portrait | char(6) | |
| | landscape | char(6) | |
| | pitch_10 | char(6) | |
| | pitch_12 | char(6) | |
| | pitch_16 | char(18) | |
| messages | msg_code | smallint | |
| | msg_description | char(70) | |
| accum_priority | ap_priority | serial | |
| | ap_construct | char(128) | |
| | ap_destruct | char(128) | |
| | ap_min_o_hour | char(2) | |
| | ap_hour_o_day | char(2) | |
| | ap_day_o_mon | char(2) | |
| | ap_mon_o_year | char(2) | |
| | ap_day_o_week | char(2) | |
| | descr | char(80) | |
| | ap_status | char(1) | |
| acc_control | acc_unique | serial | accum_chan, chan_prop |
| | run_date | date | |
| | run_time | datetime hour to second | |
| | accum_cnt | integer | |
| | last_alarm | datetime year to second | |
| chan_prop | acc_unique | integer | chan_lock, acc_control |
| | ep_unique | integer | equip_prop |
| procedures | acc_unique | integer | chan_lock |
| | procedure_document | char(120) | |
| oid | oid_unique | integer | equip_prop |
| | oid_value | char(80) | |
| datapoint | dp_date | date | |
| | dp_time | datetime year to second | |
| | dp_eqtime | datetime year to second | |
| | accum_id | integer | accum_chan, accumulator |
| | channel | integer | accum_chan |
| | dp_avg | float | |
| | dp_high | float | |
| | dp_low | float | |
| | dp_hmd | char(1) | |
| ack | ack_id | serial | |
| | dpa_unique | integer | dp_alarm |
| | ack_method | smallint | |
| | ack_level | smallint | |
| | user_id | char(14) | |
| | ack_date | date | |
| | ack_time | datetime hour to second | |
| dp_alarm | dpa_unqiue | serial | ack |
| | dpa_date | date | |

TABLE 1-continued

| Data Structure | Variable | Format | Cross Reference |
|---|---|---|---|
| | dpa_time | datetime year to second | |
| | dpa_eqtime | datetime year to second | |
| | accum_id | integer | accumulator |
| | alarm_channel | integer | |
| | dpa_type | char(4) | |
| | dpa_descr | char(80) | |
| | dpa_analog_val | float | |
| | dpa_status | char(1) | |
| accumulator | accum_id | serial | dp_alarm, datapoint |
| | site_id | integer | service_site |
| | descr | char(80) | |
| | ipaddress | char(15) | |
| | ip_port | integer | |
| | config_doc | char(256) | |
| | priority | integer | |
| | parse_cmd | char(128) | |
| | mib_prefix | char(20) | |
| | mib_mfg_num | char(10) | |
| | et_id | integer | |
| equip_prop | ep_unique | serial | chan_prop, derived_prm, accum_chan |
| | ep_et_id | integer | equip_template |
| | ep_type_id | char(1) | |
| | ep_oid | char(80) | |
| | ep_dec_places | smallint | |
| | ep_multiplier | float | |
| | descr | char(200) | |
| | ep_val_type | smallint | |
| | ep_len | smallint | |
| | ep_default | char(1) | |
| | ep_active | char(1) | |
| | channel | integer | |
| | chan_type | integer | channel_type |
| | notes | char(100) | |
| | oid_unique | integer | oid |
| channel_type | chan_type | serial | equip_prop, accum_chan |
| | descr | char(50) | |
| | chan_ind | char(1) | |
| equip_typ | eq_typ_id | serial | equipment, equip_template |
| | descr | char(80) | |
| equip_template | ep_et_id | serial | equip_prop |
| | descr | char(80) | |
| | eq_typ_id | integer | equip_typ |
| | eq_model | char(80) | |
| | eq_version | char(80) | |
| | mib_prefix | char(20) | |
| | mib_mfg_num | char(10) | |
| equipment | equip_id | serial | equip_site |
| | descr | char(80) | |
| | eq_grp_id | integer | equip_grp |
| | eq_typ_id | integer | equip_type |
| equip_grp | eq_grp_id | serial | equipment |
| | descr | char(80) | |
| equip_site | es_unique | serial | |
| | equip_id | integer | equipment, service_site |
| | site_id | integer | |
| | descr | char(80) | |
| service_site | ss_unique | serial | |
| | equip_id | integer | equip_site |
| | site_id | integer | cust_site, accumulator |
| | descr | char(80) | |
| cust_site | site_id | serial | service_site, rpt_requests |
| | cust_id | integer | customer, rpt_requests |
| | descr | char(80) | |
| | priority | smallint | |
| | tmzone | char(50) | |
| | observe_ds | char(1) | |
| | site_category | char(4) | site_category |
| site_category | site_category | char(4) | cust_site |
| | descr | char(80) | |
| customer | cust_id | serial | cust_site, fm_login |
| | descr | char(80) | |
| | tmzone | char(50) | |
| | observe_ds | char(1) | |
| | web_path | char(128) | |
| | system_dsn | char(10) | |
| | email | char(30) | |
| | fax | char(14) | |
| | addr1 | char(30) | |
| | addr2 | char(30) | |
| | city | char(25) | |
| | state | char(4) | |
| | zip | char(10) | |
| fm_login | fml_login_id | serial | user_prefs |
| | fml_logname | char(8) | fm_login_log, rpt_key, rpt_requests |
| | fml_password | char(8) | |
| | fml_auth_type | char(4) | |
| | cust_id | integer | customer |
| | fml_descr | char(40) | |
| | email | char(30) | |
| | fax | char(14) | |
| | addr1 | char(30) | |
| | addr2 | char(30) | |
| | city | char(25) | |
| | state | char(4) | |
| | zip | char(10) | |
| fm_login_log | fml_logname | char(8) | fm_login |
| | fml_when | datetime year to second | |
| | fml_success | char(1) | |
| | fml_ip_addr | char(20) | |
| rpt_requests | req_id | serial | |
| | rpt_id | integer | cust_rpt |
| | site_id | integer | cust_site |
| | cust_id | integer | cust_site, cust_rpt, rpt_key |
| | fml_logname | char(8) | fm_login |
| | req_date | date | |
| | req_time | char(8) | |
| | deliv_meth | char(1) | |
| | deliv_email | char(25) | |
| | deliv_fax | char(14) | |
| | deliv_addr1 | char(30) | |
| | deliv_addr2 | char(30) | |
| | deliv_addr3 | char(30) | |
| | deliv_addr4 | char(30) | |
| | priority | char(1) | |
| | status | char(1) | |
| cust_rpt | cr_unique | serial | cr_prompts |
| | cust_id | integer | rpt_requests |
| | rpt_id | integer | rpt_requests |
| | start_date | date | |
| | stop_date | date | |
| | rpt_cycle | char(1) | |
| | last_rpt_date | date | |
| | last_rpt_time | datetime hour to second | |
| | deliv_meth | char(1) | |
| | address | char(256) | |
| fm_reports | rpt_id | serial | fm_rpt_prompts |
| | rpt_title | char(60) | |
| | rpt_name | char(60) | |
| | rpt_path | char(256) | |
| | rpt_description | char(80) | |

TABLE 1-continued

| Data Structure | Variable | Format | Cross Reference |
|---|---|---|---|
| rpt_key | cust_id | integer | rpt_requests |
|  | fml_logname | char(8) | fm_login |
|  | rpt_id | integer | fm_rpt_prompts |
|  | session_id | integer |  |
|  | rpt_dtime | datetime year to second |  |
| fm_rpt_prompts | rpt_id | integer | fm_reports, rpt_key |
|  | frp_prompt_seq | smallint |  |
|  | frp_prompt_name | char(40) |  |
|  | frp_prompt_line1 | char(80) |  |
|  | frp_prompt_line2 | char(80) |  |
|  | frp_prompt_line3 | char(80) |  |
|  | frp_prompt_imgref | char(80) |  |
|  | frp_required | char(1) |  |
|  | frp_datatype | char(1) |  |
|  | frp_prompt_type | char(1) |  |
|  | frp_prompt_table | char(18) |  |
|  | frp_prompt_value | char(18) |  |
|  | frp_prompt_option | char(100) |  |
| cr_prompts | cr_unique | integer | cust_rpt |
|  | prompt_name | char(40) |  |
|  | prompt_value | char(40) |  |
| event_rpt | acc_unique | integer | fm_notify |
|  | act_ind | char(1) |  |
|  | delivery_method | char(1) |  |
|  | address | char(256) |  |
| fm_notify | acc_unique | integer | accum_chan, event_rpt |
|  | seq_no | smallint |  |
|  | act_ind | char(1) |  |
|  | notify_typ | char(1) |  |
|  | address | char(70) |  |
|  | msg_macro | char(150) |  |
|  | alert_level | char(1) |  |
| accum_chan | acc_unique | serial | fm_notify, acc_control, datapoint |
|  | accum_id | integer |  |
|  | equip_id | integer |  |
|  | channel | integer | datapoint |
|  | chan_type | integer | channel_type |
|  | descr | char(80) |  |
|  | dp_date | date |  |
|  | dp_time | datetime year to second |  |
|  | dp_eqtime | datetime year to second |  |
|  | dp_avg | float |  |
|  | dp_high | float |  |
|  | dp_low | float |  |
|  | dpa_date | date |  |
|  | dpa_time | datetime year to second |  |
|  | dpa_eqtime | datetime year to second |  |
|  | alarm_channel | integer |  |
|  | dpa_type | char(4) |  |
|  | dpa_descr | char(80) |  |
|  | dpa_analog_val | float |  |
|  | dpa_status | char(1) |  |
|  | pre_alarm_det1 | integer |  |
|  | post_alarm_det1 | integer |  |
|  | hi_hi_thresh | float |  |
|  | hi_lo_thresh | float |  |
|  | lo_hi_thresh | float |  |
|  | lo_lo_thresh | float |  |
|  | alarm_chan1_id | integer |  |
|  | alarm_chan1_desc | char(80) |  |
|  | alarm_chan1_pri | smallint |  |
|  | alarm_chan2_id | integer |  |
|  | alarm_chan2_desc | char(80) |  |
|  | alarm_chan2_pri | smallint |  |
|  | alarm_chan3_id | integer |  |
|  | alarm_chan3_desc | char(80) |  |
|  | alarm_chan3_pri | smallint |  |
|  | alarm_chan4_id | integer |  |
|  | alarm_chan4_desc | char(80) |  |
|  | alarm_chan4_pri | smallint |  |
|  | ep_unique | integer | equip_prop |
|  | ep_oid | char(80) |  |
|  | ep_dec_places | smallint |  |
|  | ep_multiplier | float |  |
|  | chan_priority | integer |  |
|  | event_priority | integer |  |
|  | rpt_priority | integer |  |
|  | notify_status | char(1) |  |
|  | notify_time | datetime year to second |  |
|  | ack_status | char(1) |  |
|  | ack_time | datetime year to second |  |
|  | oid_unique | integer |  |
| user_prefs | fml_login_id | integer | fm_login |
|  | fml_name | char(20) |  |
|  | fml_value | char(50) |  |
| dt_test | dtt_datetime | datetime year to second |  |
| event_grp | master_channel | integer |  |
|  | detail_channel | integer |  |

What is claimed is:

1. A system for hosted centralized monitoring of a plurality of client facilities with a plurality of subsystems and a plurality of components comprising:

(a) a data communications means for communicating a plurality of conditional state data gathered from a plurality of sensors wherein said conditional state data is utility usage within said client facilities, a physical environmental condition within said client facilities, a physical security condition within said client facilities, a physical hazard condition within said client facilities, or operational data from a subsystem within said client facilities; and (b) a data harvester, said data harvester collects, stores, processes, retrieves, and reports said conditional state data, said data harvester facilitating efficient numerical storage and management of said conditional state data based on presence or absence of a failure, a fault or an anomalous condition.

2. A system for hosted centralized monitoring of a plurality of client facilities with a plurality of subsystems and a plurality of components comprising:

(a) a data communications means for communicating a plurality of conditional state data gathered from a plurality of sensors wherein said conditional state data is utility usage within said client facilities, a physical environmental condition within said client facilities, a physical security condition within said client facilities, a physical hazard condition within said client facilities, or operational data from a subsystem within said client facilities;

(b) a data collection server to collect and to temporarily store said conditional state data;

(c) a data filtering means for numerically compressing said conditional state data over a specified time period, said data filtering means facilitating efficient numerical storage and management of said conditional state data based on presence or absence of a failure, a fault or an anomalous condition;

(d) a high resolution data storage means for archiving said conditional state data without said data filtering when said failure, said fault or said anomalous condition is present;

(e) a low resolution storage means for archiving said conditional state data after said data filtering when said failure, said fault or said anomalous condition is absent;

(f) an event switch means for determining whether said conditional state data identifies said failure, said fault or said anomalous condition by comparing said conditional state data to operational limits, for directing said conditional state data to said high resolution data storage means when said failure, said fault or said anomalous condition is identified, and for directing said conditional state data to said low resolution data storage means when said failure, said fault or said anomalous condition is absent; and (g) a report means for retrieving, displaying, and transmitting said conditional state data.

3. The system of claim 2 further comprising a network means for linking said data communications means, said data collection server, said storage means, said event switch means, and said report means.

4. The system of claim 2 further comprising a workstation means for monitoring operations at said management system.

5. The system of claim 4 further comprising a network means for linking said data communications means, said data collection server, said storage means, said event switch means, said report means, and said workstation means.

6. A method for hosted centralized monitoring of a plurality of client facilities with a plurality of subsystems and a plurality of components, said method comprising the steps of:

(a) querying a client facility;

(b) collecting a plurality of conditional state data from a plurality of sensors wherein said conditional state data is utility usage within said client facilities, a physical environmental condition within said client facilities, a physical security condition within said client facilities, a hazard condition within said client facilities, or operational data from a subsystem within said client facilities;

(c) buffering said conditional state data in a temporary storage database;

(d) analyzing said conditional state data in said temporary storage database to identify a failure, a fault or an anomalous condition by comparing said conditional state data to operational limits;

(e) archiving said conditional state data to a high resolution storage database when said failure, said fault or said anomalous condition is present;

(f) filtering said conditional state data over a defined time interval when said failure, said fault or said anomalous condition is absent, said filtering summarizes said conditional state data over said defined time interval, said filtering facilitating efficient numerical storage and management of said conditional state data; and (g) archiving said conditional state data after said data filtering to a low resolution storage database when said failure, said fault or said anomalous condition is absent.

7. The method of claim 6 wherein said filtering consists of identifying a lowest value, a highest value, and an average value for said conditional state data.

8. The method of claim 6 further comprising the step of reporting said conditional state data to said client facilities.

9. The method of claim 8 wherein said reporting is achieved by a graphics-based interface accessible over a distributed network.

* * * * *